US006060445A

United States Patent [19]
Chandraker et al.

[11] Patent Number: 6,060,445
[45] Date of Patent: *May 9, 2000

[54] POLYMER CLEANING COMPOSITIONS AND METHODS

[75] Inventors: Vinay Kumar Chandraker, Houston, Tex.; Hidemasa Oda, Okayama, Japan

[73] Assignee: EVAL Company of America, Lisle, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/829,401

[22] Filed: Mar. 31, 1997

[51] Int. Cl.$^7$ .................................................. C11D 3/37
[52] U.S. Cl. ........................... 510/475; 510/476; 510/188
[58] Field of Search .................................. 510/188, 475, 510/476

[56] References Cited

U.S. PATENT DOCUMENTS

| | | | |
|---|---|---|---|
| 3,071,498 | 1/1963 | Kaskel | 134/7 |
| 3,119,720 | 1/1964 | Stiles et al. | 134/22 |
| 3,869,525 | 3/1975 | Miller | 260/873 |
| 3,926,876 | 12/1975 | Fukushima et al. | 260/23 R |
| 4,425,288 | 1/1984 | Tieszen et al. | 264/39 |
| 4,838,945 | 6/1989 | Fujii et al. | 134/7 |
| 4,838,948 | 6/1989 | Bailey | 134/8 |
| 4,954,545 | 9/1990 | Bailey | 524/158 |
| 5,032,632 | 7/1991 | Saxton | 524/139 |
| 5,236,514 | 8/1993 | Leung et al. | 510/188 |
| 5,298,078 | 3/1994 | Itoh et al. | 510/475 |
| 5,397,498 | 3/1995 | Ishida et al. | 252/174.23 |
| 5,415,799 | 5/1995 | Maitz | 252/162 |
| 5,424,012 | 6/1995 | Ertle et al. | 264/39 |
| 5,443,768 | 8/1995 | Scheibelhoffer et al. | 264/39 |
| 5,460,760 | 10/1995 | Tsai et al. | 264/39 |

FOREIGN PATENT DOCUMENTS

| | | | |
|---|---|---|---|
| 0308703 A2 | 3/1989 | European Pat. Off. | C08L 29/04 |
| 0 560 369 A2 | 9/1993 | European Pat. Off. | C08L 23/02 |
| 0 800 910 A1 | 10/1997 | European Pat. Off. | B29C 47/08 |
| 0 813 948 A2 | 12/1997 | European Pat. Off. | B29C 47/08 |
| 53-35582 | 8/1975 | Japan | C08K 5/13 |
| 63-286459 | 11/1988 | Japan | C08L 29/08 |
| 5-279518 | 10/1993 | Japan | C08L 23/00 |
| 5279518 | 10/1993 | Japan | B29C 33/72 |
| 6134770 | 5/1994 | Japan | B29C 33/72 |
| 7-329113 | 12/1995 | Japan | B29C 45/17 |
| 09217091 | 8/1997 | Japan | C11D 7/22 |

OTHER PUBLICATIONS

Pucci, Mark, et al. "Fundamental Aspects of Adhesive Strength in Coextruded Structures." *Journal of Plastic Film & Sheeting,* Technomic Publishing Co., Inc., vol. 7(1), Jan. 1991, pp. 24–42.

Sneller, Joseph. "What Can Be Coextruded? The Sky's The Limit." *Modern Plastics International,* vol. 10(9), Sep. 1980, pp. 56–58.

Botros, Maged G. "Purging Compound For Polyamides and Ethylene Vinyl Alcohol Copolymers." *Journal of Plastic Film & Sheeting,* Technomic Publishing Co., Inc., vol. 12(3), Jul. 1996, pp. 212–224.

Kamykowski, Gregory W., et al. "The Effect of Layer Geometry on Tie Layer Adhesion of Coextruded Films." *ANTEC '96 Proceedings,* vol. 1, may 1966, pp. 121–125.

Tanny, Dr. Stephen R. "Optimization of Coextrudable Adhesive Performance." *Polymers, Laminations & Coatings Conference 1990 Proceedings,* vol. 1, 1990, pp. 471–475.

*Primary Examiner*—Jerry D. Johnson
*Attorney, Agent, or Firm*—Michael L. Winkelman; Thomas D. Wilhelm

[57] ABSTRACT

This invention pertains to cleaning compositions and methods for cleaning a first polymer composition from polymer processing apparatus. The cleaning compositions generally comprise a second polymer composition and at least one metal salt composition wherein the respective metal is selected from alkaline earth and transition metals. The second polymer composition has an affinity, for the first polymer, of "Ad" between 50 and about 1500, where "Ad" is adhesive strength, grams/15 mm width, between the first and second polymer compositions in a multiple layer cast coextruded film. The cleaning composition comprises about 0.001 to about 10 weight percent metal salt composition based on total weight of the cleaning composition. A 50/50 weight percent mixture of the second polymer composition, and a third polymer composition which can be processed in polymer processing apparatus suitable for processing the first polymer composition, preferably has a melt index ratio MI-mix$_{60}$/MI-mix$_6$ of 0.3/1 to 5/1.

22 Claims, No Drawings

POLYMER CLEANING COMPOSITIONS AND METHODS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND

This invention relates generally to cleaning compositions for cleaning polymer compositions from polymer processing apparatus. While the principles of the invention can apply to a wide variety of polymer processing situations, the invention is described herein specifically with respect to purge compositions for purging ethylene vinyl alcohol copolymer (EVOH) from extrusion and other apparatus suitable for extruding, thus shaping or molding EVOH. Thus, the principles described herein are not limited to EVOH, but are limited only by the operability of the principles disclosed herein with respect to the polymer composition or compositions of interest.

EVOH resin is widely employed for, among other things and without limitation, food packaging and other applications as a gas and/or flavor barrier material. EVOH is usually extruded from a die in a single or multiple layer structure, and may thus be fabricated into a wide variety of shapes, such as films, sheets, or bottles.

Melted EVOH resin has a known affinity for metals, and thus tends to build up inside the extruder and downstream equipment (e.g. adapter, screens, and shaping die) of related polymer processing apparatus. EVOH is also quite sensitive to the time during which it is exposed to extruder-type temperatures. Namely, the "OH" moieties in EVOH tend to cross-link with each other.

The physical result is that, as a typical extrusion "run" progresses, viscosity of the EVOH extrudate gradually increases (MI decreases), while the amount of cross-linked EVOH builds up inside the extrusion and shaping equipment. As material continues to build up in the extrusion and shaping equipment, at some point the build-up is great enough that the material begins to break loose and show up in the extrudate as gels. The number of gels increases with time. Large numbers of gels are generally unacceptable in shaped products so made. Thus, the extruder must, from time-to-time, be purged (cleaned out) of the EVOH build-up.

One method for cleaning out the EVOH is to shut down, cool off, disassemble, and physically scrape/clean, etc. the extrusion equipment. A preferred method is to run through the extrusion and shaping equipment some material that will clean out the EVOH, including the build-up inside the respective equipment. Such material is generically known as a "purge" material, and the process is called "purging."

With EVOH, "purging" must be done periodically, even if the resin being extruded is always EVOH. Using conventional technology, the interval between "purgings" of EVOH is typically 1–7 days. Thus, "purging" is a very important part of operating an extruder even where EVOH is the only material being processed through that particular extruder.

Another situation where purging is important is where the material being extruded is to be changed. Thus, for example, if EVOH is to be extruded, followed by a run of Nylon in the same extruder, the EVOH must be fully and dependably purged from all respective polymer processing apparatus, including extruder, adapter, screen, die, and the like, before the nylon can be run. If the purging is less than complete, residual EVOH in the extruder reacts with the incoming nylon, forming an unacceptable quantity of gels in the extruded nylon polymer.

Thus, a requirement of a preferred purge material is that it must effectively remove substantially all EVOH from the polymer processing apparatus, and it must not react with the polymer composition to be subsequently extruded through that polymer processing apparatus. Nor should the purge material remain in the extruder for any extended time after the start of feeding of the subsequent polymer composition to the extruder for fabrication of product therefrom.

Transition to and from purge material is accompanied by continued operation of the extruder. Thus, the extruder screw continues to turn while changes are made in e.g. feed material, temperature settings, screw speed, and the like. Typical such transitions can be represented by sequences which look like, for example

EVOH→PURGE→EVOH
EVOH→PURGE→NYLON
EVOH→PURGE→POLYOLEFIN

This invention is directed toward the composition and use of the purge material, specifically as used for purging EVOH.

Materials conventionally used for purging EVOH are polyolefins such as polyethylene or polypropylene. Such purge materials can reduce build-up of EVOH in the flow channel of e.g. the extruder. However, such materials are not effective to clean the extrusion apparatus sufficiently that gel formation is reduced to an acceptable level when the extruder is subsequently used to extrude further product.

U.S. Pat. No. 3,071,498 Kaskel teaches purging polyethylene with thermoplastic granules coated with silicone oil.

U.S. Pat. No. 3,119,720 Stiles et al teach a 3-step purging process using (i) pentaerythritol, (ii) metal and a sequestering agent, and (iii) polyethylene.

U.S. Pat. No. 3,869,525 Miller teaches purging with a mixture of polyethylene and polyester.

U.S. pat. No. 4,425,288 Tieszen et al teach purging poly(arylene) sulfide from spinning equipment using polyolefin such as polyethylene or polypropylene.

U.S. Pat. No. 4,838,945 Fujii et al teach a purge composition including sodium sulfonic acid, water, and thermoplastic.

U.S. Pat. No. 4,838,948 Bailey and 4,954,545 Bailey teach purge compositions including polyethylene, sulfonated surfactant, and abrasive.

U.S. Pat. No. 5,397,498 Ishida et al teach purge compositions including polyalkylene oxide glycol and alkyl sulfate.

U.S. Pat. No. 5,424,012 Ertle et al teach using a frothing additive in a purge material.

U.S. Pat. No. 5,443,768 Scheibelhoffer et al teach purge materials including abrasive, unsaturated resin, and copolymer of olefin acrylate or methacrylate.

U.S. Pat. No. 5,460,760 Tsai et al teach coating the interior of EVOH extrusion equipment with fluoropolymer.

Japan application 5-279,518 teaches a purge material which is a combination of polyolefin and a metal composition.

Japan application 7-329,113 teaches using maleic anhydride modified polyethylene as a purge material.

Japan 62-143,954 and corresponding U.S. Pat. No. 5,032,632 teach a stabilizer package for EVOH including a metal salt and an acid component.

Japan 63-286,459 and corresponding 8-19293 teach using hindered phenol as a thermal stabilizer in EVOH.

EPA 0 308 703 A2 teaches a stabilizer package for EVOH including a metal salt, and two acid components.

None of the above resins or purge materials efficiently purge EVOH from the polymer processing apparatus. Rather, long purge times are required, and/or long run times are required of the subsequent material until the frequency of gel occurrences is low enough that the material can be used as product.

It is an object of the invention to provide an excellent cleaning composition, as a purge material, for purging EVOH and other materials from polymer processing apparatus.

It is a more specific object to provide a cleaning composition for purging EVOH, to be followed by further processing of EVOH in the same polymer processing apparatus.

It is a further specific object to provide a cleaning composition for purging EVOH, to be followed by processing of another polymer composition, devoid of EVOH, for example nylon.

It is yet another object to provide a method of purging EVOH from polymer processing apparatus.

It is still a further object to provide a method of at least temporarily maintaining uninterrupted operation of polymer processing apparatus by periodically effectively purging the polymer processing apparatus of accumulated internal build-up of polymer inside the processing apparatus.

SUMMARY

Some of the objects are obtained in cleaning compositions and methods for cleaning a first polymer composition, e.g. EVOH, from polymer processing apparatus. Other objects are obtained in methods of maintaining at least temporarily uninterrupted operation of polymer processing apparatus by using cleaning compositions of the invention.

Cleaning compositions of the invention generally comprise a second polymer composition, including at least one metal salt composition wherein the respective metal is selected from alkaline earth and transition metals. The second polymer composition has an affinity, for the first polymer composition, of "Ad" between 50 and about 1500, preferably between 150 and about 1500, where "Ad" is adhesive peel strength (grams/15 mm width) between the first and second polymer compositions in a multiple layer cast coextruded film. The cleaning composition (second polymer) comprises about 0.001 to about 10 weight percent of the metal salt composition based on total weight of the cleaning composition.

A 50/50 weight percent mixture of the second polymer composition, and a third polymer composition which can be processed in polymer processing apparatus suitable for processing the first polymer composition, preferably has a melt index ratio MI-mix$_{60}$/MI-mix$_6$ of 0.3/1 to 5/1, more preferably 0.5/1 to 3/1.

Preferred second polymer compositions include acid modified polymers, the base polymer so modified being selected from the group consisting of low density polyethylene, medium density polyethylene, high density polyethylene, linear low density polyethylene, polypropylene, ethylene vinyl acetate, ethylene methyl acrylate, and compatible combinations thereof. Highly preferred acid modified second polymer compositions comprise acid modified olefin-based polymer, for example maleic anhydride modified olefin-based polymer such as maleic anhydride modified polyethylene. Such second polymer compositions have melt index at 190 degrees C. 2160 grams load of 0.1 to 50 grams/10 minutes, preferably 1 to 20 grams/10 minutes.

Other materials preferred for use as base polymer for the second polymer composition include ethylene vinyl acetate, ionomer, thermoplastic polyurethane, polyamide, polyester, styrene ethylene propylene copolymer, styrene ethylene butylene styrene copolymer, and compatible combinations thereof.

The third polymer composition should not be highly reactive with the second polymer composition. Given the above second polymer compositions, exemplary third polymer compositions are selected from the group consisting of ethylene vinyl alcohol copolymer; polyethylenes such as low density polyethylene, medium density polyethylene, high density polyethylene, very low density polyethylene, and cross linkable polyethylene; polybutylene; cross linkable polybutylene; ethylene vinyl acetate copolymer; polypropylene; polyamide; polyester; thermoplastic elastomer; polyvinylidene chloride copolymer; and compatible combinations thereof. In accord with the above examples, in some embodiments, the third polymer composition includes EVOH, and in other embodiments the third polymer composition is devoid of EVOH.

The metal salt is preferably present in the cleaning composition in amount of about 0.002 to about 3 weight percent, more preferably 0.1 to about 2 weight percent. Preferred metal may be an alkaline earth metal. Examples of certain ones of the preferred metals are selected from the group consisting of calcium, magnesium, manganese, and zinc. Preferred metal salts are derived from organic acids having from 8 to 20 carbon atoms.

In some embodiments, a fourth polymer composition is combined with the second polymer composition, with the combination of the second and fourth polymer compositions corresponding to "Ad" between 50 and 1500, preferably between 150 and 1500. Exemplary of fourth polymer compositions are low density polyethylene, linear low density polyethylene, medium density polyethylene, high density polyethylene, very low density polyethylene, cross linkable polyethylene, polybutylene, cross linkable polybutylene, ethylene vinyl acetate copolymer, polypropylene, thermoplastic elastomers, and compatible combinations thereof.

The cleaning composition of the invention can include any of a variety of inorganic compositions having general particle size of about .05 micron to about 20 microns and which are believed to operate by principles of abrasion, scraping, and/or scouring.

DESCRIPTION OF THE ILLUSTRATED EMBODIMENTS

This invention is directed at the process of cleaning/purging a first polymer composition being processed through polymer processing apparatus, and thereby molded into a product, such that the polymer processing apparatus is sufficiently clean that the processing apparatus can be used to produce further molded product without necessarily disassembling the processing apparatus. In general, the cleaning/purge material is a second polymer composition which is introduced into the processing apparatus immediately behind the last elements of the first polymer composition being molded, and is processed through the polymer processing apparatus without stoppage of the processing operation.

Upon completion of the purging/cleaning, the processing apparatus is so thoroughly cleaned that a following third polymer composition can be introduced into the processing apparatus directly behind the purge material, and the third polymer composition processed into molded product with reduced incidence of gels and other imperfections such that acceptable product is readily produced therewith.

The result of such effective purging is to at least temporarily maintain uninterrupted operation of the polymer processing apparatus to further produce usable product. It will be understood by those skilled in the art that all such polymer processing apparatus is periodically shut down for manual cleaning. By temporarily maintaining uninterrupted operation, this invention is effective to reduce the frequency of such shut-downs.

Purge materials of the invention can be selected so as to enable use of a third polymer composition which would react readily with the first polymer composition to produce unacceptable gels in the molded products so produced using the third polymer composition if the first polymer composition were not adequately purged from the polymer processing apparatus. Namely, the purge material (second polymer composition) cleans the polymer processing apparatus so thoroughly that the amount of the first polymer left in the polymer processing apparatus when the third polymer composition is introduced thereinto is so small as to be insufficient to interfere with acceptable molding of the third polymer composition. Thus, using purge material of the invention, and with continuous operation of the polymer processing apparatus, nylon, for example, can be processed in the same apparatus which previously processed EVOH, with continuous operation of the processing apparatus and with only the purge material being processed therethrough between the EVOH and the nylon.

In general, a first property of the second polymer composition is that it have a requisite level of affinity for the melted first polymer composition (e.g. EVOH). To that end, adhesion "Ad" of the second polymer composition to the first polymer composition must be at least 50 grams/15 mm. The adhesion is measured in a multiple layer cast film containing adjoining layers of the first and second polymer compositions.

If the adhesive strength is less than 50 grams/15 mm, the purging efficiency is not acceptable. Therefore, the adhesive strength should have at least 50 grams/15 mm, preferably at least 150 grams/15 mm.

As a second preferred property, since the third polymer composition is in intimate contact with the purge material as the third polymer composition is introduced to the polymer processing apparatus, the purge material should in general not react with the third polymer composition. At minimum, the third polymer composition should not be highly reactive with the purge material.

Similarly, combinations of the purge material and the third polymer composition should have relatively stable viscosity over time under polymer processing conditions, e.g. extrusion processing conditions. In that regard, a 50/50 weight percent mixture of the purge material, and the third polymer composition which can be processed in the polymer processing apparatus processing the first polymer composition, should have, according to the invention, a melt index ratio of MI-mix$_{60}$/MI-mix$_6$ of 0.3/1 to 5/1.

If the purge material reacts with the third polymer composition and thereby changes the viscosity of the extrudate such that the composition becomes more viscous with time whereby the melt index ratio is lower than 0.3/1, there is a risk that an unacceptable number of gels may be formed during extrusion of the third polymer composition because of reaction between the third polymer composition and the residual purge material remaining in the polymer processing apparatus.

If, on the other hand, the purge material reacts with the third polymer composition and thereby changes the viscosity of the extrudate such that the composition becomes less viscous with time whereby the melt index ratio is higher than 5/1, the result could be melt flow instability, and potentially voids in the extrudate. Thus, the combination of the purge material (second polymer composition) and the third polymer composition should preferably satisfy the above melt index ratio, and preferably should be between 0.5/1 and 3/1.

A preferred class of materials which can be used as base polymer for the second polymer composition, and which in general has the above two characteristics, is acid modified polyolefin. Examples of such material are, without limitation, maleic anhydride modified polyethylene (e.g. low density, medium density, high density, linear low density, and copolymers of ethylene), maleic anhydride modified polypropylene, maleic anhydride modified ethylene vinyl acetate copolymer, maleic anhydride modified methacrylate, and the like. Such acid or maleic anhydride modified polymer compositions are widely available as adhesive polymers wherein the acid or anhydride modification is e.g. polymerized into the base polymer in amount of from about 0.01 weight percent to about 15 weight percent.

Other examples of base polymers for use in the second polymer composition, which are not acid modified, but which are nevertheless suitable therefore in certain instances, are, without limitation, ethylene vinyl acetate copolymer, ionomer, thermoplastic polyurethane, polyester, styrene-ethylene-propylene copolymer, and styrene-ethylene-butylene-styrene copolymer, so long as such materials satisfy the affinity requirements and the requirements of stability of melt index when combined with the third polymer composition as discussed above.

The melt index of base polymer used in the second polymer composition preferably has a melt index at 190 degrees C 2160 gram load, of from 0.1 to 50 grams/10 minutes.

A third characteristic of the second polymer composition (purge material) of the invention is that such material include about 0.001 weight percent to about 10 weight percent of a metal salt of an acid, including metal acetates. The acid preferably is an organic acid, and preferably has 8 to 20 carbon atoms. In preferred embodiments, the metal salt is present in the second polymer composition in amount of 0.002 to 3 weight percent, more preferably 0.1 to 2 weight percent.

The metal is an alkaline earth or transition metal. Without limitation, preferred metals are calcium, magnesium, manganese, and zinc. Examples of the metal salts are, without limitation, metallic fatty acid salts such as magnesium stearate, calcium stearate, zinc stearate, and manganese stearate, other salts of stearic acid, including salts of stearic acids containing magnesium or other metals in the monovalent form. A highly suitable, commercially available, form of stearic acid suitable for the present invention, is powdered magnesium stearate containing approximately 7.5% magnesium ion.

The second polymer composition can be a combination of the above described base polymers with one or more other polymers (fourth polymer composition) so long as the above characteristics are met for the combined second polymer composition. Examples of such fourth polymer compositions are, without limitation, polyethylene (e.g. low density polyethylene, linear low density polyethylene, medium density polyethylene, high density polyethylene, very low density polyethylene cross linkable polyethylene), polybutylene, cross linkable polybutylene, ethylene vinyl acetate copolymer, polypropylene, and thermoplastic elastomer.

The fraction of the second polymer composition which can be represented by the fourth polymer composition depends in part on the level of affinity between the base polymer and the first polymer (EVOH). The level of affinity between the base polymer and the first polymer can be a function of the amount of acid or anhydride, or equivalent, polymerized into the base polymer. Thus, where higher levels of e.g. anhydride in the base polymer result in higher levels of affinity between the base polymer and e.g. EVOH, the maximum acceptable fraction of fourth polymer composition is generally higher than where a lower level of affinity exists between the base polymer and the EVOH.

In some embodiments of the invention, an inorganic powder is added and thus becomes part of the second polymer composition to enhance the effectiveness of the purging operation, e.g. as a scouring, scraping, or abrasive material. Examples of such inorganic powder are, without limitation, a single material or a mixture of two or more kinds of material selected from the group consisting of silicon dioxide, diatomaceous earth, white carbon, calcium silicate, aluminum silicate, bentonite, zeolite, magnesium carbonate, gypsum, pumice, volcanic ash, calcium carbonate, etc. Further discussion of suitable such materials is set forth in U.S. Pat. No. 4,838,945 Fujii et al, herein incorporated by reference in its entirety.

The second polymer composition can be made by mixing the above recited, and any other desirable, compatible, and operable ingredients, and by melt blending or other conventional blending method which brings the respective ingredients into intimate contact and mixture with each other, preferably a generally homogeneous mixture, and produces the second polymer composition in such form as can be readily introduced into the polymer processing apparatus of interest.

Polymer processing apparatus specifically contemplated herein includes, without limitation, an extruder, adapter, screens, and die. Other devices typically used with such extrusion apparatus is, of course, included. Further, as used herein, polymer processing apparatus includes other apparatus, such as mixers, used to process polymer compositions. Thus, this invention can be used with any apparatus useful to process polymer compositions, especially polymer melt compositions, and is not limited to extrusion processing apparatus, though such is contemplated as the primary use of the invention.

EVOH suitable for use with respect to the present invention can be prepared by the methods disclosed in, for example, U.S. Pat. Nos. 3,510,464; 3,560,461; 3,585,177; and 3,847,845. In general, EVOH is hydrolyzed ethylene vinyl acetate copolymer, also referred to as saponified ethylene vinyl acetate copolymer.

The degree of hydrolysis of the EVOH should be more than 85 mole percent, preferably more than 95 mole percent. The EVOH preferably contains about 15 mole percent to about 70 mole percent ethylene moieties, and respectively about 30 mole percent to about 85 mole percent vinyl alcohol moieties. Copolymers having less than 15 mole percent ethylene tend to be difficult to extrude, while those having greater than 70 mole percent ethylene have reduced oxygen barrier performance.

EVOH copolymers suitable for use in the present invention are commercially available from e.g. EVAL Company of America, Lisle, Ill. EVAL Company produces a wide range of EVOH copolymers, e.g. a suitable ethylene vinyl alcohol copolymer under the designation "EP-E" which has 42 to 46 mole percent ethylene, melt index of about 5.5 at 210 degrees C. 2160 gram load, and melting point of 164 degrees C. Another suitable EVOH copolymer has about 29 mole percent ethylene and a melting point of 188 degrees C. Still another suitable EVOH copolymer, described in U.S. Pat. No. 4,252,169 has 40 mole percent ethylene and a melting point of 164 degrees C. Other manufacturers also produce suitable EVOH copolymers.

The EVOH may have any melt index (210 degrees C. load 2160 grams) but generally the melt index is from about 0.5 to about 50 grams/10 minutes.

The EVOH referred to herein includes embodiments of EVOH copolymer wherein the EVOH has been modified with a small amount, for example about 0.5 mole percent to about 10 mole percent of a modifying monomer copolymerizable with ethylene vinyl alcohol copolymer. Examples of the modifying monomer are vinyl silane propylene, 1-butene, 1-hexene, 4-methyl-1-pentene, acrylates, methacrylates, maleic acid, phthalic acid, itaconic acid, higher aliphatic acids, vinyl esters, alkyl vinyl ethers, N vinyl pyrrolidone, N-n-butoxymethylacrylamide, N-(2-dimethylaminoethyl) methacrylamide, and quaternary compounds thereof and N-vinylimidazole and quaternary compounds thereof. As used herein, including in the claims which follow, the expressions "ethylene vinyl alcohol" and "EVOH" include material having such copolymerized monomer therein.

The EVOH may also comprise a combination of two or more EVOH materials having e.g. different ethylene content and/or degree of saponification.

The third polymer, namely the polymer which is introduced into the extruder immediately following completion of the purge operation with purge material of the invention, can be selected from a wide variety of polymers which are compatible with the purge materials in accord with the characteristics described above. Thus, the third polymer can, without limitation, be selected from the group consisting of polyethylene (e.g. low density polyethylene, linear low density polyethylene, medium density polyethylene, high density polyethylene, very low density polyethylene, cross linkable polyethylene), polybutylene, cross linkable polybutylene, ethylene vinyl acetate copolymer, polypropylene, polyamide, polyester, and thermoplastic elastomer. The purge material of the invention is especially useful when the third polymer composition is polyamide or polyester because such materials generally react quite actively with EVOH.

Methods of the invention can be practiced using purging or other cleaning steps as generally practiced in the art, using the purge/cleaning compositions (second polymer compositions) of the invention. The polymer processing steps preceding the purge/cleaning steps can be virtually any known polymer processing steps, including, without limitation, single layer or multiple Layer extrusions of cast film or sheet, blown film, extrusion coating, or other single or multiple layer extruded structures. The most preferred method of such processing of polymer is coextrusion, including coextrusion of pipe using a multiple manifold circular die. Coextrusion processes useful to form multiple layer structures are generally known as indicated in, for example, "Modern Plastics Encyclopedia" Volume 56, No. 10A, pages 131–132, McGraw Hill, October, 1979.

It is contemplated that the operation and functions of the invention have become fully apparent from the foregoing description of elements and their cooperations with each other, but for completeness of disclosure the usage of the invention will be briefly described.

A typical purging sequence, for purging EVOH from an extruder is as follows. The relevant polymer processing apparatus generally includes an extruder, an adapter, a screen, a die, and like equipment. After the EVOH extrusion has proceeded for a time during which EVOH has accumulated in the processing apparatus, and needs to be purged/cleaned from the apparatus, the purge material is introduced into the extruder through the extruder hopper, using usual techniques. A typical amount of purge material is 6 to 50 times the volume of the melt channel, the extruder, the adapter, and the die.

The screw speed is adjusted as needed to accommodate transport and processing of the purge material through the extrusion processing apparatus. Similarly, temperatures at the several locations along the processing line in the extrusion apparatus are adjusted to accommodate efficient transport and operation of the purge material through the processing system.

Generally, the temperature is the same as the previous temperatures when EVOH was being processed, or higher.

After suitable quantity of the purge material has been run through the processing system, the EVOH is effectively purged thereby from the processing apparatus. Once the EVOH is effectively purged from the processing apparatus, the third polymer may be introduced into the extruder, and processed to make molded product therefrom without risk of reaction with EVOH. In the alternative, once the EVOH has been effectively purged from the extrusion processing apparatus, the system can be shut down with the purge material in the system. Upon start-up, the system can be operated taking into account only the presence of the purge material, and without any consideration of the previous use of EVOH in the system.

In the Examples which follow, property measurements were made as follows.

Adhesive strength/affinity testing.

Adhesive strength of the second polymer composition with respect to EVOH was measured on cast coextruded film as follows. A 40 mm extruder having a metering type screw with a length to diameter ratio (L/D) of 22/1 was used for processing the second (purging) polymer composition into a layer. A 40 mm extruder having a metering type screw with an L/D ratio of 27/1 was used for processing EVOH. A 65 mm extruder having a metering type screw with a L/D ration of 25/1 was used for processing low density polyethylene (LDPE). Resin temperature at the die was 220 degrees C. The chill roll was maintained at 50 degrees C. Air was used for cooling the film so produced. Line speed was about 10 meters/min. The structure of the film was

/LDPE/PURGE/EVOH/PURGE/LDPE/.

The relative thicknesses of the respective layers, in order, in microns, were

/33/7/5/7/33/.

The so prepared film was conditioned at 20 degrees C, 65% relative humidity for 15 days. The film was then cut into sample strips 15 mm wide, with the lengths of the strips extending in the machine direction. Thus, the 15 mm widths of the strips extended in the transverse direction of the extrusion process. The sample films were then separated between the EVOH layer and one of the purge layers at 250 mm/min separation speed, still in the 20 degrees C, 65% RH environment according to ASTM F904-91, 1992 book of ASTM Standards Vol. 15.09.

Melt Index.

The 50/50 weight percent compositions of the purge material and the third polymer composition were dry blended and placed in a standard melt indexer conforming to ASTM D1238, Tinus Olsen. Measurement temperature was 230 degrees C. Load weight was 2160 grams. Sample size was 4 grams +0.1 gram.

Melt index was measured at 6 minutes (MI-mix$_6$) and 60 minutes (MI-mix$_{60}$) at temperatures 20 degrees higher than the melting temperatures of the respective third polymer compositions.

EXAMPLE 1

Purge material of the invention was made as follows. 100 parts by weight maleic anhydride modified polyethylene made by Quantum Chemical Company, Chicago, Ill., under the name PLEXAR® PX360, and 4 parts by weight magnesium stearate were mixed. The mixture was fed into a 20 mm diameter single screw extruder and melt blended, and pellets of the so-formulated purge material were formed from the so-blended materials.

The purging properties of the above purge material were demonstrated as follows

1. A 20 mm single screw extruder and respective adapter and 300 mm T-die were dismantled and cleaned by hand. After cleaning, the die, adapter, and extruder were reassembled, and were then heated to zone 1 temperature 175 degrees C, zone 2 temperature 224 degrees C, zone 3 temperature 224 degrees C, adapter temperature 224 degrees C. and die temperature 224 degrees C.
2. EVALCA EVAL® LC-F101A EVOH resin, 32 mole percent ethylene, melt index 1.6, degree of saponification 99.6%, was extruded into a monolayer film with screw speed of 40 rpm for 3 hours.
3. The above mentioned purge material was then fed into the hopper directly following the EVOH extrusion with continuing operation of the screw, and with increase in screw speed to 150 rpm. Initially on transport of the purge material through the extruder, a large amount of yellowish resin, believed to be EVOH, was observed in the extruded purge material. After running the purge material at the above temperature and screw speed settings for fifteen minutes, temperature settings were changed to zone 1 temperature 232 degrees C, zone 2 temperature 249 degrees D, zone 3 temperature 254 degrees C, adapter temperature 254 degrees C, and die temperature 254 degrees C, and the purging was continued for another 15 minutes. Total running time of this step 3 was 30 minutes.
4. The screw speed was then reduced to 40 rpm, and nylon-6 (B35 from BASF) was fed into the extruder and the extruder subsequently operated for 4 hours. The extruded nylon film was evaluated periodically regarding appearance, including the number of gels.

The number of gels in the nylon film did not increase significantly with time. After 4 hours operation, the number of gels was 1–9 gels per 100 square inches. By comparison, when nylon was introduced after hand cleaning of the extrusion apparatus, and without any preliminary running of EVOH, the number of gels using the same extrusion apparatus was 1–gels per 100 square inches.

Adhesive strength between the EVOH and the purge material was measured by the above mentioned method, with resulting 600 grams/15 mm.

The resulting number of gels, adhesive strength, and melt index ratio, are shown in Table 1.

EXAMPLE 2

Example 2 was the same as Example 1 except that the purge material was a blend of 30 parts by weight of the maleic anhydride modified polymer used in EXAMPLE 1, 70 parts by weight unmodified polyethylene, and 4 parts by weight magnesium stearate. The resulting number of gels, adhesive strength, and melt index ratio, are shown in Table 1.

EXAMPLE 3

Example 3 was the same as Example 1 except that the purge material was a blend of 10 parts by weight of the maleic anhydride modified polymer used in EXAMPLE 1, 90 parts by weight unmodified polyethylene, and 4 parts by weight magnesium stearate. The resulting number of gels, adhesive strength, and melt index ratio, are shown in Table 1.

EXAMPLE 4

Example 4 was the same as Example 2 except that 1000 ppm by weight $SiO_2$ powder, made by Fuji Silysia Chemical Company, Kasugai City, Aichi, Japan, was added to the composition of the purge material. The resulting number of gels, adhesive strength, and melt index ratio, are shown in Table 1.

COMPARATIVE EXAMPLE 1

Example 1 was repeated except that the low density polyethylene of Example 2 without acid or anhydride modification, was used as the purge material, without magnesium stearate. The number of gels, adhesive strength, and melt index ratio, are shown in Table 1.

COMPARATIVE EXAMPLE 2

Example 1 was repeated except that the maleic anhydride modified polyethylene of Example 1 was used as the purge material, but without the magnesium stearate. The number of gels, adhesive strength, and melt index ratio, are shown in Table 1.

COMPARATIVE EXAMPLE 3

Example 2 was repeated except that the purge material was a mixture of 100 parts unmodified low density polyethylene and 2 parts magnesium stearate. The number of gels, adhesive strength, and melt index ratio, are shown in Table 1.

COMPARATIVE EXAMPLE 4

The EVALCA EVAL® LC-F101A EVOH resin, as in Example 1, was used as the first polymer composition. The purge material was made by mixing, blending, and pelletizing 100 parts by weight of the same EVOH and 2 parts by weight of magnesium stearate at step 3. The number of gels, adhesive strength, and melt index ratio, are shown in Table 1.

TABLE 1

| | Purging Material Composition | | | | | | | | Results | | |
|---|---|---|---|---|---|---|---|---|---|---|---|
| | 2d Resin | | Metal Salt | | Additive | | | | "Ad" | | No. |
| Ex | Type | phr | Type | phr | Poly | phr | Other | phr | Gr | MI$_{60/MI6}$ | Gels |
| 1 | MAhPE | 100 | Mg-Stea | 2 | — | — | — | — | 600 | 1.1 | 1–9 |
| 2 | MAhPE | 30 | Mg-Stea | 2 | LDPE | 70 | — | — | 600 | 1.1 | 2–4 |
| 3 | MAhPE | 10 | Mg-Stea | 2 | LDPE | 90 | — | — | 600 | 1.1 | 2–8 |
| 4 | MAhPE | 30 | Mg-Stea | 2 | LDPE | 70 | SiO$_2$ | .01 | 600 | 1.1 | 1–4 |
| CE1 | LDPE | 100 | — | — | — | — | — | — | —0— | 0.9 | 60–40 |
| CE2 | MAhPE | 100 | — | — | — | — | — | — | 600 | 1.1 | 100 |
| CE3 | LDPE | 100 | Mg-Stea | 2 | — | — | — | — | —0— | 1.1 | 10–20 |
| CE4 | EVOH | 100 | Mg-Stea | 2 | — | — | — | — | >1500 | 0.1 | 10–20 |

Ex = Example Number
CE1 = Comparative Example
MAhPE = Maleic Anhydride modified polyethylene
phr = Pounds per hour
Poly = Polymer
Gr = Grams The invention is not limited in its application to the details of construction and the arrangement of the components set forth in the above description. The invention is capable of additional embodiments or of being practiced or carried out in various ways not specifically disclosed herein. Also, it is to be understood that the terminology and phraseology employed herein is for purpose of description and illustration and should not be regarded as limiting.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A cleaning composition for cleaning a first polymer composition from a polymer processing apparatus, said cleaning composition comprising:
   (a) a second polymer composition which has an affinity of "Ad" between 50 and about 1500
       where "Ad" is adhesive strength (grams/15 mm width) between the first and second polymer compositions in a multiple layer cast coextruded film; and
   (b) at least one metal salt composition wherein the respective metal is selected from alkaline earth and transition metals, said metal salt composition being present in said cleaning composition in amount of about 0.001 weight percent to about 10 weight percent based on total weight of said cleaning composition,
wherein the first polymer composition is an ethylene vinyl alcohol copolymer and the cleaning composition reduces gel formation when compared to a cleaning composition not containing the at least one metal salt composition.

2. A cleaning composition as in claim 1, said second polymer composition further comprising a third polymer composition to form a 50/50 weight percent mixture which can be processed in polymer processing apparatus suitable for processing the first polymer composition, having a melt index ratio MI-mix60/MI-mix6 of 0.3/1 to 5/1, wherein MI-mix60 is the melt flow rate (grams/10 minutes) of the mixture (2160 grams load weight) at 20 degrees C. above the melting temperature of said third polymer composition after holding the mixture in melt index apparatus at such temperature for 60 minutes, and wherein Mi-mix6 is the melt flow rate, grams/10 minutes, of the mixture, 2160 grams load weight, at 20 degrees C. above the melting temperature of said third polymer composition after holding the mixture in melt index apparatus at such temperature for 6 minutes.

3. A cleaning composition as in claim 2 wherein said second polymer composition is not highly reactive with said third polymer composition under conditions of operation of the polymer processing apparatus.

4. A cleaning composition as in claim 2 wherein the 50/50 weight percent mixture has a melt index ratio Mi-mix$_{60}$/MI-mix$_6$ of 0.5/1 to 3/1.

5. A cleaning composition as in claim 2 wherein said second polymer composition comprises maleic anhydride modified polyethylene.

6. A cleaning composition as in claim 2 wherein said second polymer composition comprises acid modified polymer, the base polymer so modified being selected from the group consisting of low density polyethylene, medium density polyethylene, high density polyethylene, linear low density polyethylene, polypropylene, ethylene vinyl acetate, ethylene methyl acrylate, and compatible combinations thereof.

7. A cleaning composition as in claim 2 wherein said second polymer composition is selected from the group consisting of ethylene vinyl acetate, ionomer, thermoplastic polyurethane, polyamide, polyester, styrene ethylene propylene copolymer, styrene ethylene butylene styrene copolymer, and compatible combinations thereof.

8. A cleaning composition as in claim 2 wherein said metal salt composition comprises an alkaline earth salt of an acid having from 8 to 20 carbon atoms.

9. A cleaning composition as in claim 2 wherein said second polymer composition comprises maleic anhydride in combination with polyethylene, wherein said metal salt composition is present, in said cleaning composition, in amount of about 0.1 weight percent to about 2 weight percent, and comprises a magnesium salt of a fatty acid having from 8 to 20 carbon atoms.

10. A cleaning composition as in claim 9 wherein the third polymer composition is selected from the group consisting of ethylene vinyl alcohol copolymer, polyethylene, polyamide, polyester, polyvinylidene chloride copolymer, and compatible mixtures thereof.

11. A cleaning composition as in claim 1 wherein said second polymer composition comprises acid modified olefin-based polymer.

12. A cleaning composition as in claim 1 wherein said second polymer composition comprises acid modified polymer, the base polymer which is so modified being selected from the group consisting of low density polyethylene, medium density polyethylene, high density polyethylene, linear low density polyethylene, polypropylene, ethylene vinyl acetate, ethylene methyl acrylate, and compatible combinations thereof.

13. A cleaning composition as in claim 1 wherein said second polymer composition comprises maleic anhydride modified olefin-based polymer.

14. A cleaning composition as in claim 1 wherein said second polymer composition comprises maleic anhydride modified polyethylene.

15. A cleaning composition as in claim 1 wherein said second polymer composition has a melt index at 190 degrees C. 2160 grams load, of 0.1 to 50 grams/10 minutes.

16. A cleaning composition as in claim 1 wherein said second polymer composition is selected from the group consisting of ethylene vinyl acetate, ionomer, thermoplastic polyurethane, polyamide, polyester, styrene ethylene propylene copolymer, styrene ethylene butylene styrene copolymer, and compatible combinations thereof.

17. A cleaning composition as in claim 1 wherein said metal salt composition is present in said cleaning composition in amount of about 0.002 weight percent to about 3 weight percent.

18. A cleaning composition as in claim 1 wherein the metal in said metal salt composition is selected from the group consisting of calcium, magnesium, manganese, and zinc.

19. A cleaning composition as in claim 1, and including a fourth polymer composition combined with said second polymer composition and wherein the combination of said second and fourth polymer compositions corresponds to "Ad" between 50 and about 1500.

20. A cleaning composition as in claim 19 wherein said fourth polymer composition is selected from the group consisting of low density polyethylene, linear low density polyethylene, medium density polyethylene, high density polyethylene, very low density polyethylene, cross linkable polyethylene, polybutylene, cross linkable polybutylene, ethylene vinyl acetate, polypropylene, thermoplastic elastomers, and compatible combinations thereof.

21. A cleaning composition as in claim 19 wherein said second polymer composition comprises a maleic anhydride modified polyethylene and said metal salt composition is a magnesium salt of a fatty acid having from 8 to 20 carbon atoms and present in amount of about 0.1 weight percent to about 2 weight percent in combination with a low density polyethylene as the fourth polymer.

22. A cleaning composition as in claim 1 wherein said metal salt composition comprises an alkaline earth salt of an acid having from 8 to 20 carbon atoms.

* * * * *